(12) United States Patent
Finkelstein (10) Patent No.: US 9,025,621 B2
(45) Date of Patent: May 5, 2015

(54) SYSTEMS AND METHODS FOR DISTRIBUTING CONTENT OVER MULTIPLE BANDWIDTH MEDIUMS IN A SERVICE PROVIDER NETWORK

(71) Applicant: Cox Communications, Inc., Atlanta, GA (US)

(72) Inventor: Jeff Finkelstein, Alpharetta, GA (US)

(73) Assignee: Cox Communications, Inc., Atlanta, GA (US)

( * ) Notice: Subject to any disclaimer, the term of this patent is extended or adjusted under 35 U.S.C. 154(b) by 295 days.

(21) Appl. No.: 13/690,768

(22) Filed: Nov. 30, 2012

(65) Prior Publication Data

US 2014/0153584 A1    Jun. 5, 2014

(51) Int. Cl.
*H04L 12/24* (2006.01)
*H04Q 11/00* (2006.01)
*H04L 12/863* (2013.01)

(52) U.S. Cl.
CPC ............ *H04Q 11/0067* (2013.01); *H04L 47/50* (2013.01)

(58) Field of Classification Search
CPC ..... H04L 41/0896; H04L 5/007; H04L 47/50; H04J 14/0242; H04J 14/025; H04Q 11/0067
USPC ..................... 370/468; 398/42–103
See application file for complete search history.

(56) References Cited

U.S. PATENT DOCUMENTS

| | | | |
|---|---|---|---|
| 2008/0267630 A1* | 10/2008 | Qian et al. | 398/89 |
| 2009/0097852 A1* | 4/2009 | Qian et al. | 398/89 |
| 2010/0028002 A1* | 2/2010 | Qian et al. | 398/79 |
| 2010/0054735 A1* | 3/2010 | Wei et al. | 398/26 |
| 2010/0061470 A1* | 3/2010 | Wei et al. | 375/260 |
| 2011/0058813 A1* | 3/2011 | Boyd et al. | 398/68 |
| 2012/0033972 A1* | 2/2012 | Dai | 398/58 |
| 2012/0149418 A1* | 6/2012 | Skubic et al. | 455/509 |
| 2012/0176990 A1* | 7/2012 | Zou | 370/329 |
| 2013/0004155 A1* | 1/2013 | Liang et al. | 398/9 |
| 2013/0045012 A1* | 2/2013 | Kanonakis et al. | 398/66 |
| 2013/0142515 A1* | 6/2013 | Chen et al. | 398/67 |
| 2013/0236177 A1* | 9/2013 | Fang et al. | 398/66 |
| 2013/0236178 A1* | 9/2013 | Garavaglia et al. | 398/67 |
| 2013/0239165 A1* | 9/2013 | Garavaglia et al. | 725/129 |

* cited by examiner

*Primary Examiner* — Paul H Masur
(74) *Attorney, Agent, or Firm* — Sutherland Asbill & Brennan LLP (57) ABSTRACT

Systems and methods for distributing content over various mediums in a service provider network are disclosed. Such mediums may include an optical fiber and a cable line having a bandwidth less than that associated with the optical fiber. In certain embodiments herein, content may be distributed over the cable line, or relatively low bandwidth medium, according to characteristics of the optical fiber, or relatively high bandwidth medium. In one embodiment, data packets may be scheduled using first in first out (FIFO) scheduling for distribution over the cable line using Orthogonal Frequency Division Multiplexing (OFDM). Using this approach, increased bandwidths may be achieved over cable lines. Additionally, certain embodiments herein are directed to maintaining a forward/reverse channel split, which may exist in a PON, over a cable line. Further, certain embodiments herein may relate to dynamic allocation of subcarriers in an OFDM signal in response to changes in quality of service.

17 Claims, 5 Drawing Sheets

SYSTEMS AND METHODS FOR DISTRIBUTING CONTENT OVER MULTIPLE BANDWIDTH MEDIUMS IN A SERVICE PROVIDER NETWORK

TECHNICAL FIELD

Embodiments of this disclosure relate generally to electronic content, and more particularly, to distributing electronic content over a network.

BACKGROUND

Service providers, such as cable or satellite providers, may provide content to customer or user locations where it may be viewed and/or interacted with by users. As demand for content increases, greater bandwidths may be required to meet the demand. Existing systems may provide greater bandwidths at least in part through optical fibers or other mediums having relatively high bandwidth capacity. These systems, however, may also include existing cable mediums that are used in conjunction with optical fiber to connect a service provider to a user location. Such cable mediums may have relatively smaller bandwidth capacities and may therefore slow the delivery of content to user locations. Replacing existing cable mediums with optical fiber or other mediums having a relatively high bandwidth capacity may be expensive and require significant time to deploy, both of which may make it difficult to meet demand for content in a timely, cost-effective manner.

BRIEF DESCRIPTION

Some or all of the above needs and/or problems may be addressed by certain embodiments of the disclosure. Certain embodiments herein may include systems and methods for transmitting content between a service provider and a customer location over multiple transport mediums that may have different bandwidth capacities. According to one embodiment, there is disclosed a system including at least one memory and at least one processor configured to execute computer-executable instructions in the memory. The at least one processor may be configured to execute computer-executable instructions to receive, over a first medium having a first bandwidth capacity, one or more data packets; determine one or more subcarriers in a signal for carrying the one or more data packets; schedule the one or more data packets, wherein the scheduling comprises encoding the one or more data packets onto the one or more subcarriers according to a first in first out (FIFO) schedule; and distribute the signal over a second medium, wherein the second medium comprises a second bandwidth that is less than the first bandwidth.

According to another embodiment, there is disclosed a method for receiving, over a first medium having a first bandwidth capacity, one or more data packets; determining one or more subcarriers in a signal for carrying the one or more data packets; scheduling the one or more data packets, wherein the scheduling comprises encoding the one or more data packets onto the one or more subcarriers according to a first in first out (FIFO) schedule; and distributing the signal over a second medium, wherein the second medium comprises a second bandwidth that is less than the first bandwidth.

According to a further embodiment, there is disclosed there is disclosed one or more computer-readable media storing computer-executable instructions that, when executed by at least one processor, configure the at least one processor to perform operations. Such operations include receiving, over an optical fiber having a first bandwidth, one or more PON packets; determining one or more subcarriers in an OFDM signal for carrying the one or more PON packets; scheduling the one or more PON packets, wherein the scheduling comprises encoding the one or more PON packets onto the one or more subcarriers according to a first in first out (FIFO) schedule; and distributing the OFDM signal over a cable line, wherein the cable line comprises a bandwidth that is less than the first bandwidth.

Other embodiments, systems, methods, aspects, and features of the disclosure will become apparent to those skilled in the art from the following detailed description, the accompanying drawings, and the appended claims.

BRIEF DESCRIPTION OF THE FIGURES

The detailed description is set forth with reference to the accompanying drawings, which are not necessarily drawn to scale. The use of the same reference numbers in different figures indicates similar or identical items.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

Detailed Description

Illustrative embodiments herein are directed to, among other things, distribution of content between a service provider and a customer or user location. A service provider, such as a cable provider, may communicate with a user location, such as a home, business, or other facility, over one or more networks. Such networks may include various types of transport mediums, such as optical fiber and coaxial cable, each of which may be utilized to connect the service provider to the customer premise. The various types of transport mediums may have different bandwidth capacities. For example, an optical fiber medium may have a bandwidth capacity that enables content to be distributed at a bit rate that is relatively higher than a bit rate at which content may be distributed over a coaxial medium. According to an example configuration herein, a Passive Optical Network (PON), which may enable packets (e.g., PON packets, Ethernet PON (EPON) packets, gigabit Ethernet PON (GEPON) packets, etc.) to be distributed over optical fibers in a service provider network, may exist for at least a portion of the service provider network. At least one other portion of the service provider network may include one or more cable lines, such as coaxial cable, radio frequency (RF) cables, and/or twisted pair cables. Certain embodiments herein relate to distributing PON packets over cable lines while maintaining characteristics of the PON packets, such as, but not limited to, increased bandwidth capacity relative to traditional cable mediums, and forward and reverse channel communications over a single cable line, including time-slotting for managing communication from a user location to a cable service provider.

According to certain embodiments herein, PON packets may be encoded onto multiple subcarrier frequencies in a frequency spectrum and modulated over a cable medium to achieve increased bandwidths over the cable medium. For example, a 10 gigabit PON may be maintained over a coaxial cable by modulating PON packets over a 1 gigahertz frequency spectrum at 10 bits per second per Hertz (bits/second/Hz). In one embodiment, Orthogonal Frequency Division Multiplexing (OFDM) may be utilized to modulate PON packets in such fashion. In one embodiment, the PON packets may be scheduled for transmission over a cable line using first in first out (FIFO) scheduling, or another scheduling technique. PON packets may be encoded onto multiple subcarrier frequencies in an OFDM signal according to FIFO scheduling and distributed across a cable medium to a user location, where content associated with the PON packets may be presented to a user at the user location.

By utilizing FIFO packet scheduling in conjunction with OFDM modulation as described herein, communications from a service provider to a user location (e.g., forward channel) and communication from a user location to a service provider (e.g., reverse channel) that may be leveraged by PONs to distribute data packets may also occur over a single cable line. A certain range of frequencies in the cable line may be utilized for forward channel communications via time division multiplexing (TDM), and a different range of frequencies in the cable line may be utilized for reverse channel communications via time division multiple access (TDMA) communication.

Examples of information that may be sent over a forward path in a cable line may include content, such as text, video, audio, multimedia, and/or other data that may be received from a content provider such as a television network. Such information may also include map messages that may be utilized to allocate bandwidth for distributing content or other information to customer premise equipment at a user location and configure the customer premise equipment for communication with a service provider. Reverse path communication may include requests for or other information from the customer premise equipment. Each of these types of communication directed to scheduling PON packets for distribution over a cable medium using OFDM modulation will be discussed in greater detail below. Other encoding techniques in addition to OFDM that may operate in the frequency division duplex (FDD) domain may be utilized in other embodiments.

Certain embodiments herein may also relate to dynamic allocation of bandwidth in response to changes in quality of service at customer premises. For example, a map message as described may include a certain quality of service associated with user locations. A certain number of carrier frequencies in an OFDM signal may be dynamically allocated for a user location based on changes to a user's quality of service (or demand for bandwidth), as may be indicated in the map message. For example, 20 megabits per second bandwidth may be utilized to serve thirty-two customer premises, which may require twenty carriers each of which may include a 100 megahertz frequency spectrum capable of distributing 10 megabits/s/Hz. One customer premise, for example, may utilize two of the carriers to receive a bandwidth of 2 megabits/second. A user who receives content at such a bandwidth may change a level of service by, for example, requesting greater data transmission speeds or a higher definition content for video. In response, certain embodiments herein may allocate additional or fewer carrier frequencies to provide the modified quality of service requested by the user. Such allocation may be performed in association with scheduling PON packets for distribution over a cable line using OFDM modulation, as will be described in greater detail below.

The technical effects of certain embodiments herein may include, but are not limited to, increased bandwidths associated with distributing content or other information over existing cable lines that may be used in conjunction with optical fiber to distribute content between a service provider and customer premises. Because increased bandwidths may be realized over existing cable lines, costs and challenges associated with replacing existing cable lines with optical fiber or higher bandwidth mediums may be accomplished gradually while customer demand for increased bandwidths may be met. Additionally, as cable lines are replaced with higher bandwidth mediums, modification of the OFDM modulation technique described herein may not be required by virtue of certain embodiments herein maintaining PON characteristics over existing cable lines.

Figure 1:
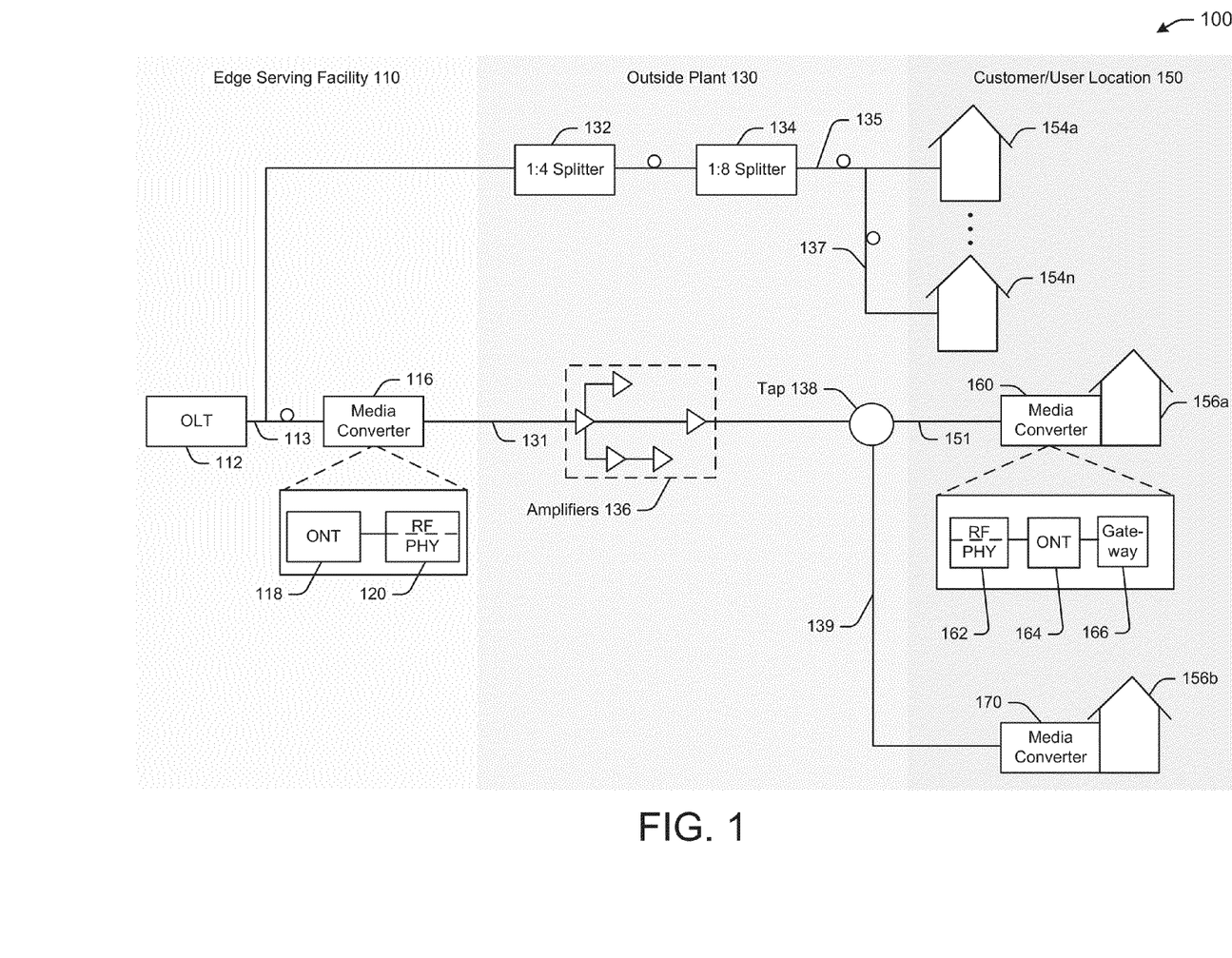
FIG. 1 illustrates a block diagram of an example service provider network for enabling communication between a service provider and user locations, according to an embodiment of the disclosure.

FIG. 1 depicts a block diagram of an example service provider network 100 for enabling communication between a service provider and user locations, according to an embodiment of the disclosure. The service provider network 100 may include multiple infrastructures that may support various types of networks for enabling communication between a service provider and customer premises or locations. Examples of such networks may include a Passive Optical Network (PON) and a cable network, among others. As shown in FIG. 1, the edge serving facility 110, outside plant 130, and customer premises 150 may each include infrastructures that enable such communication. The infrastructures may include various systems or devices to facilitate the communication. As shown in the embodiment in FIG. 1, the edge serving facility 110 may include an Optical Line Terminator (OLT) 112, a media converter 116, and one or more optical fibers 113.

The outside plant 130 may include optical splitters 132 and 134 that may allow an optical fiber to be shared amongst multiple customer locations 154a-154n, as well as one or more cable lines 131 and amplifiers 136 that may be utilized to amplify signals traveling over the one or more cable lines 131. The outside plant 130 may further include one or more taps 138 that may allow a cable line 131 to be shared amongst multiple customer locations 156a and 156b, via cable lines 151 and 139, respectively.

The customer premises 150 may include the cables lines 151 and 139 which may be connected to media converters 160 and 170, respectively, which may be associated with customer locations 156a and 156b, respectively. The optical fiber and cable line connections may facilitate communication between the various devices. For example, the media converter 116 may communicate with the OLT 112 over optical fiber 113 and may communicate with the media converters 160 and 170 over the cable lines 151 and 139, respectively, as well as cable line 131. Examples of the types of communication between such devices will be described in greater detail below.

Although a certain number of devices are shown in FIG. 1, fewer or more may exist in other embodiments. For example, many more media converters may be shown in association with additional edge serving facilities and/or user locations. Additionally, the devices shown in FIG. 1 may be associated with different infrastructures or portions of the service provider network 100. For example, the media converter 116 may exist in the outside plant 130 and may be included within a fiber node (not shown). As more optical fibers are deployed, according to one embodiment, the location of the media converter 116 may change such that the media converter 116 is located at or near a junction between an optical fiber 113 and a cable line 131. Such configurations may facilitate the distribution of content or other information over a cable medium according to the characteristics of a PON as described herein.

As used herein, a PON may refer to a point-to-multipoint fiber to the premises network architecture in which unpowered optical splitters may be utilized to enable a single optical fiber to serve multiple customer premises. Use of the term PON herein is not meant to be limiting. Certain embodiments herein may also be directed to various types of PONs, such as Ethernet PON (EPON) and gigabit PON (GEPON), both of which may carry Ethernet packets. In other embodiments, a service provider network may include various other types of networks, such as one or more active optical networks (AON), secure passive optical networks (SPON), or other networks that may include optical fibers, cable, and/or various other transport mediums.

As used herein, the term "device" may refer to any computing component that includes one or more processors that can be configured to execute computer-readable, computer-implemented, or computer-executable instructions. Example devices can include personal computers, server computers, digital assistants, smart phones, personal digital assistants, digital tablets, Internet appliances, application-specific circuits, microcontrollers, minicomputers, transceivers, customer premise equipment such as set-top boxes, kiosks, or other processor-based devices. The execution of suitable computer-implemented instructions by one or more processors associated with various devices may form special purpose computers or other particular machines that may facilitate distribution of content as described herein.

The edge serving facility 110 may include a central office or facility that includes various computing devices, line termination units, and other equipment that may be configured to manage communication between devices in the service provider network. For example, OLT 112 may be located within a central office and may represent an endpoint in a PON. The OLT 112 may receive content that originated from content providers, such as television networks, Internet Service Providers (ISPs), or other providers of content, and generate one or more broadband signals or data packets (e.g., PON packets) representing such content. The OLT 112 may distribute PON packets to media converters, such as media converter 116, which may be located within the edge server facility, and media converter 162, which may be located at or near a user location 160. The OLT 112 may also manage upstream communication, such as requests for content, from multiple media converters associated with respective user locations.

As shown in FIG. 1, the media converter 116 may be a standalone computing device in the edge serving facility 110. In other embodiments, the functionality associated with the media converter 116 may be included in a head end server (not shown) in the edge serving facility 110, in the OLT 112, or in association with other computing devices in the edge serving facility 110. In yet other embodiments, the media converter 116 may be located in the outside plant 130 within a fiber node (not shown), which may receive and distribute content or other information over optical fibers or cable lines.

The media converter 116 may include an Optical Network Terminator (ONT) 118 and an RF physical layer 120, among other components. The ONT 118 may terminate a PON, as may be depicted in FIG. 1 by optical fiber 113 extending from one end of the media converter 116 and the cable line 131 extending from the other end. The ONT 118 may include a scheduler, such as a Media Access Control (MAC) scheduler, for scheduling distribution of PON packets over cable lines, e.g., cable lines 131, 139, and 151, using FIFO scheduling (or other scheduling techniques), in various embodiments. In one embodiment, the ONT 118 may receive PON packets associated with content and/or other information in the form of a light signal, e.g., from the OLT 112, over the optical fiber 113. The ONT 118 may further convert the light signal into an electrical signal and schedule packets associated with the electrical signal for OFDM transmission (or another modulation technique) over the cable line 131 via the physical layer 120, according to one embodiment. As another example, the ONT 118 may receive electrical signals, e.g., from the media converter 160, and convert the electrical signals in to light signals for distribution via OFDM (or another modulation technique) to the OLT 112. One or more transponders for receiving electrical signals and a suitable laser, such as a 1550 nanometer (nm) band laser, may be utilized in the media converter 116 to provide at least a portion of the described communications.

An optical fiber 113 may be configured to carry broadband signals associated with PON packets over a PON. The optical fiber 113 may be configured to carry such signals as light pulses using total internal reflection, according to one implementation. Communication over the optical fiber 113 may occur over a single optical fiber. The single optical fiber 113 may include a forward or downstream path to carry signals from an OLT 112 to a media converter 116 and a return or upstream path to carry signals from a media converter 116 to the OLT 112, according to one example. In one configuration, the forward path may utilize a 1490 nanometer (nm) wavelength, while the return path may utilize a 1310 nm wavelength. Additional wavelengths and/or different wavelength frequencies may exist in other configurations. A wide variety of different optical fibers 113 may be utilized as desired in various embodiments, such as multi-mode fibers, single-mode fibers, and special purpose fibers. Additionally and/or alternatively, the optical fibers 113 may be constructed from a wide variety of different materials, such as silica, fluorides, phosphates, and/or chalcogenides.

The outside plant 130 may include various transport mediums and devices or components configured to facilitate communication over such mediums. For example, optical splitters 132 and 134 may allow an optical fiber to be shared amongst multiple user locations, e.g., the 1:4 splitter 132 may allow an optical fiber to be shared amongst four user locations, and the 1:8 splitter may allow an optical fiber to be shared amongst eight user locations. When used in combination, according to one embodiment, the splitters 132 and 134 may allow a single PON optical fiber to be shared amongst thirty-two user locations, although only two such locations are shown, for distributing broadband signals to the user locations.

A cable 131 may also be configured to communicate broadband signals using forward and reverse channels in an OFDM signal, according to certain embodiments herein. As shown in FIG. 1, the cable line 131 may connect a media converter 116 to a tap 138, which may feed multiple cable lines to respective user locations. Although only a single cable line is shown between the media converter 116 and the tap 138, any number of cable lines may exist between these and other connected devices or components, in other configurations. Further, a wide variety of suitable cable lines 131 may be utilized, including various types of coaxial cables, RF cables, and twisted pair cables, among others.

The tap (or terminator 138) may form an access point from which one or more user locations, such as locations 156a and 156b, may be provided with broadband services, e.g., via cable lines 151 and 139, respectively. Although only one tap 138 is shown, any number of taps may exist for feeding multiple number of user locations, in other configurations.

The amplifiers 134 may perform various functions in association with signals distributed over cable line 131. Such functions may include, but are not limited to, filtering and amplifying such signals. To filter signals, according to one configuration, one or more of high pass filters, band pass filters, or low pass filters may be utilized to filter out forward path or return path signals in the cable line 132 of varying frequencies. Upon filtering a signal, the amplifiers 130 may increase the magnitude of a signal, e.g., the magnitude of an OFDM signal which, as noted, may include PON data packets encoded on various subcarrier frequencies in the cable line 131. Each amplified signal may be output onto the cable line 131 in a desired direction for the signal, e.g., downstream or upstream. As desired, any number of diodes or other suitable devices may be incorporated into the amplifiers 134 to prevent or limit undesired leakage of an amplified signal in a direction from which the signal was received. For example, the amplifiers 134 may receive a return path signal from a tap 138 (which may have originated from the user location 160 or 170, another amplifier, etc.), amplify the signal, and output the signal in an upstream direction towards the OLT 112 while limiting the output or leakage of the signal in a downstream direction towards the customer premise 150.

In certain embodiments, the amplifiers 134 may be powered by a received broadband signal, such as a received downstream signal. Additionally or alternatively, the amplifiers 134 may be powered by one or more batteries and/or external power sources. In certain embodiments, the power requirements of the amplifiers 134 may be based at least in part on the modulation technique utilized in association with the broadband signals that are amplified. In one example, a relatively low power amplifier may be provided in association with an OFDM technique.

As described, the customer premises 150 may include multiple user locations. Such locations may be connected to the service provider network 100 via various transport mediums. As shown in FIG. 1, user locations 154a-154n may be connected via optical fibers, such as optical fibers 135 and 137 which are split off from an optical fiber 113 via splitter 132 and/or splitter 134. The user locations 154a-154n may include an ONT (not shown) that may terminate a PON and present a native service interface, such as video, voice, data, or other information, to a user located at the user locations 154a-154n.

The customer premises 150 may also include user locations 156a and 156b that are connected to the service provider network 100 via cable lines 139 and 151, respectively. As mentioned, fewer or more user locations may exist in other configurations. A media converter 160 may include various devices that may perform functions in association with the user location 156a. Such functions may enable the user location 156a to receive and send communications in the service provider network 100. To perform these functions, the media converter 160 may include a physical layer 162, an ONT 164, and a gateway 166. In one embodiment, the physical layer 162 and the ONT 164 may perform similar functions to the physical layer 120 and the ONT 118, respectively, in the media converter 116.

In one example, the ONT 164 may receive a broadband signal from the media converter 116. The signal may be an OFDM signal carrying PON packets as provided by the media converter 116, in one embodiment. The ONT 164 may convert the PON packets to a different format, such as Ethernet, which may be received and further processed by a gateway device 166 that may communicate with customer premise equipment (not shown) at the user location 156a over one or more suitable networks, such as a wireless fidelity (WiFi) network or a Multimedia over Coax Alliance ("MoCA") network, as non-limiting examples.

The gateway device 168 in the media converter 162 may include one or more components that may be configured to provide broadband services to a home, such as home 156a. For example, a gateway device 168 may include a broadband modem and/or a router that may be configured to process received broadband signals and provide the signals to customer premise equipment in a home, for example. Such example customer premise equipment may include, but is not limited to, set-top boxes, cable modems, routers, and network bridging devices (not shown) at the home 156a and other user locations 150. In certain embodiments, a network, such as a local area network or wide area network, may be formed between a gateway device and customer premise equipment. According to these embodiments, Ethernet packets that are generated from PON packets modulated via OFDM may travel over such networks between the media converter 160 and the customer premise equipment.

Another example gateway device may include a face-plate or termination component (e.g., a cable modem device or cable bridging device) and/or at least one Ethernet component, as non-limiting examples. The face-plate or termination component may facilitate the termination of cable lines that connect customer premise equipment to the gateway device and/or that connect the gateway device to a tap. A face-plate may be configured to pass broadband signals within an RF cable spectrum, such as broadband signals having a frequency of up to 1 GHz. Additionally, the face-plate may include a relatively low loss direct current ("DC") coupler that may be configured to pass signals within the RF cable spectrum to a cable device, such as any suitable device that facilitates the filtering and processing of various information in one or more broadband signals. The Ethernet component that may exist in a gateway device may include an Ethernet switching subsystem that may translate Ethernet signals into signals that may be utilized by customer premise equipment in a home, such as wireless fidelity (WiFi) signals or Multimedia over Coax Alliance ("MoCA") signals, as non-limiting examples.

In association with sending information from the user location 156a, the ONT 164 may receive Ethernet packets from the user location 156a, convert the Ethernet packets to PON packets, and schedule the PON packets for transmission over the cable line 151, according to one embodiment. The physical layer 162 may distribute the PON packets using OFDM modulation, in one embodiment. The media converter 160 may perform in a manner similar to the media converter 116 in the way that it may receive a certain signal and prepare the signal for distribution over cable lines while leveraging one or more characteristics of PON communication.

As illustrated in FIG. 1, the media converters 160 and 170 may be located outside of a home, for example, on an external wall of a home. The media converters 160 and 170 may be located within a home in other embodiments. In yet other embodiments, a media converter may be incorporated into a tap, e.g., tap 138.

The above illustration in FIG. 1 is non-limiting. Many more examples and configurations involving different numbers and types of devices, components, etc., may exist in other embodiments.

Figure 2:
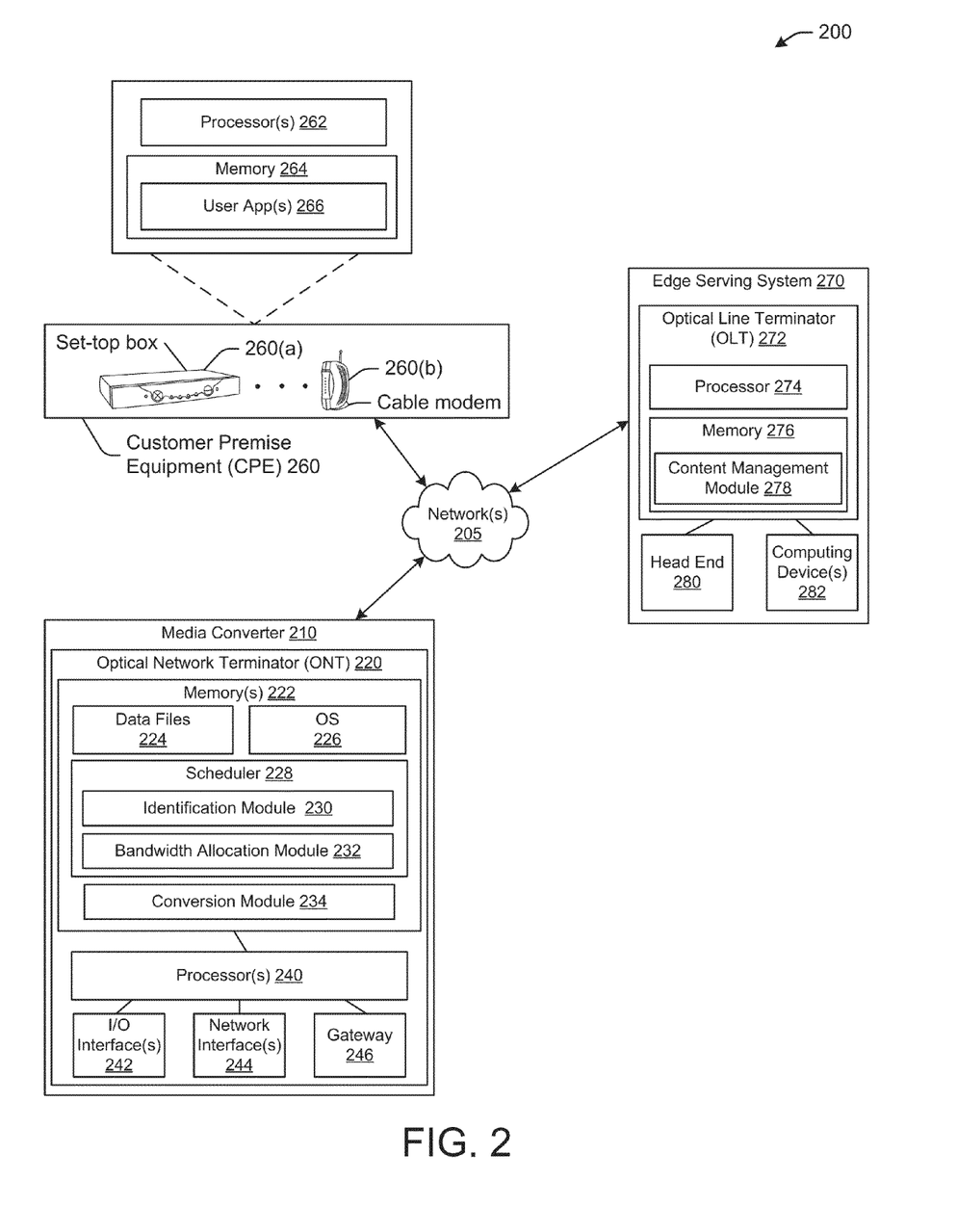
FIG. 2 illustrates a block diagram of an example computing environment that may be utilized to distribute content over variable bandwidth mediums, according to an embodiment of the disclosure.

FIG. 2 depicts a block diagram of an example computing environment 200 that may be utilized to distribute content or other information as described herein. The computing environment 200 may include, but is not limited to, a media converter 210, customer premise equipment 260, and an edge serving system 270. Each of the devices in FIG. 2 may communicate with one another via one or more networks 205. For example, the media converter 210 may communicate with another media converter that may be operably coupled to customer premise equipment 260 at a user location to communicate broadband signals between the media converters. The media converter 210 may also communicate with the edge serving system 270 to send and receive broadband signals. Each of these types of communication will be described in greater detail below.

The one or more networks 205 may include any number of wired or wireless networks that can enable various devices in the example computing environment 200 to communicate with one another. In one embodiment, the one or more networks 205 may include a PON and a cable network, each of which may include various devices that may facilitate communication of light signals and electrical signals, respectively. For example, a PON may exist between the media converter 210 and the edge serving facility 270. A cable network may exist between the media converter 210 and another media converter located at a user location. Other networks may include a WiFi network, a WiFi Direct network, a MoCA network, a Bluetooth® network, a Near Field Communication network, or other suitable networks that may exist between a gateway 246 in a media converter 210 and customer premise equipment 260 at a user location, as non-limiting examples. In other embodiments, other networks, intranets, or combinations of different types of networks may be used, including, but not limited to, the Internet, intranets, cable networks, cellular networks, landline-based networks, or other communication mediums connecting multiple computing devices to one another. Other embodiments may not involve a network and may, for example, provide features on a single device or on devices that are directly connected to one another. For example, the edge serving system 270 may be directly connected to the media converter 210.

The media converter 210 may include various devices, such as an ONT 220. The ONT 220 may include one or more processors, memory, input/output ("I/O") interfaces, and network interfaces to facilitate the processes described herein. For example, the media converter 210 may include one or more processors 240 configured to communicate with one or more memory devices 222, I/O interfaces 242, and one or more network interfaces 244. Additionally, one configuration of a media converter 210 may include a gateway device 246, whereas another configuration may not include the gateway device 246. For example, a media converter located at or near a user location may include a gateway device for communicating broadband signals to customer premise equipment 260, whereas a media converter (e.g., located at an edge serving system 270) that communicates with a media converter located at or near a user location may not include gateway device 246.

The operations and/or controls of the media converter 210 may be distributed among any number of other devices, systems, computers, and/or processing components in a service provider network, e.g., service provider network 100 in FIG. 1. For example, at least some of the functions performed by the media converter 210 (as will be discussed in greater detail below) may be performed by edge serving system 200, such as by the head end 290, one or more computing devices 292, or a combination of these devices.

The memory devices 222 may include any number of suitable memory devices, such as caches, read-only memory devices, random access memory devices, magnetic storage devices, etc. The memory devices 222 may store data, executable instructions, and/or various program modules utilized by the one or more processors 240. The various program modules are discussed in greater detail in the following sections.

The one or more I/O interfaces 242 may enable communication between one or more I/O devices including, but not limited to, one or more user interface devices such as a display, keypad, mouse, pointing device, control panel, touch screen display, remote control, microphone, speaker, etc., that may facilitate user interaction with the media converter 210. The network interfaces 244 may facilitate a connection between the ONT 220 and other devices via the network 205. In one embodiment, the network interfaces 244 may include one or more line cards (for example, modular electronic circuits on a printed circuit board that may interface with a service provider network) that may receive data packets, e.g., PON packets, from the edge serving system 270 and convert the data packets into one or more OFDM signals for transmission to one or more user locations, such as user locations 150 illustrated in FIG. 1.

The edge serving facility 270, the head end 280, the one or more computing devices 282, and the customer premise equipment 260 may also include one or more processors, memory devices, I/O interfaces, and network interfaces to enable them to perform various functions associated with distributing content over multiple bandwidth mediums as described herein. For example, the OLT 274 in the edge serving system 280 and the customer premise equipment 260 may include a processor 274 and 262, respectively, and a memory 276 and 264, respectively. The functions associated with each of these devices will be discussed in greater detail below.

Turning to the contents of the memory 222, the memory 222 may include data files 224, an operating system ("OS") 226, and various software programs and/or modules that may facilitate the functions described herein, such as distributing content over cable lines in a manner that may maintain characteristics of a PON, such as, but not limited to, increased bandwidth and forward and reverse communication over a single cable line, including time-slotting for managing communication from a user location to a cable service provider.

The data files 224 may include any suitable data that facilitates communication as described herein. For example, the data files may include data associated with map messages that may define a quality of service, timeslots for scheduling upstream communication from multiple customer premise equipment devices, or other information associated with communication between a user location and an edge serving facility or service provider device. Additional data may include information associated with the various devices in a service provider network, optical fibers, cables lines, or other transport mediums in a service provider network, customer premise equipment, user accounts associated with user locations, etc.

The operating system (O/S) 226 may be any suitable module that controls the general operation of the ONT 220. The O/S 226 may also facilitate the execution of other software modules, for example, the modules illustrated in the memory 222.

The modules in the memory 222 may include, but are not limited to, a scheduler 228 and a conversion module 234. The scheduler 228 may include, but is not limited to, an identification module 230 and a bandwidth allocation module 232. Each of these modules may provide specific functionality associated with scheduling data packets for distribution over a relatively low bandwidth medium via one or more encoding techniques while maintaining characteristics of a relatively high bandwidth medium over which the data packets may have been received, according to one embodiment. In one example, the scheduler 228 may schedule the distribution of PON packets over a cable medium using OFDM while maintaining characteristics of a PON from which the PON packets may have been received. Rather than each of the modules in the memory 222 performing specific functionality, some embodiments may involve the modules performing all or at least some of the functionality associated with the other modules.

The scheduler 228 may perform a number of functions to facilitate the processes described herein. Such functions may include receiving and storing various types of information. For example, the scheduler 228 may receive data packets associated with content, such as text, video, audio, multimedia, etc. In one embodiment, the scheduler 228 may receive the data packets over an optical fiber from an edge serving facility (e.g., edge serving facility 280), which may have received the data packets from a content provider, such as a television network. The scheduler 228 may also receive one or more map messages, which may include timeslot information for configuring customer premise equipment for upstream communication, quality of service information, other provisioning information, or other information that may facilitate communication between a service provider and a user location. In one embodiment, the scheduler 228 may receive the map message from the edge serving facility 280, which may provision services for customers utilizing a service provider network, e.g., service provider network 100 in FIG. 1.

The scheduler 228 may also store information, such as the information in a map message and information associated with data packets, as will be described below in association with the identification module 230. The information may be stored in the memory 222 (e.g., in data files 224), or in an alternative storage device accessible by the media converter 210.

The identification module 230 may identify various information in data packets associated with content or other information. Such information may include, but is not limited to, a destination (e.g., a user location or a particular edge serving system) to which to send packets associated with the content, a source or provider of the content (e.g., a television network), and a data port associated with a network over which the data packets may have been received. In one embodiment, such information may be obtained from a tuple associated with each data packet. The scheduler 228 may store data packets in customer memory queues corresponding to respective destinations (e.g., user locations) as identified by the identification module 230.

The bandwidth allocation module 232 may allocate bandwidth for distributing data packets to a user location. According to certain embodiments herein, data packets may be distributed over a cable medium using OFDM modulation. A number of subcarrier frequencies may exist in an OFDM signal, each of which may be utilized to distribute the data packets to a user location. The bandwidth allocation module 232 may identify certain subcarrier frequencies for distributing data packets to user locations. In so doing, the bandwidth allocation module 232 may access information in the map message and determine a number of subcarriers to allocate based on a quality of service indicated in the map message, according to one embodiment. The quality of service may indicate that two subcarriers, for example, among multiple other subcarriers are required to provide a desired quality of service for a user location. The bandwidth allocation module 232 may therefore identify and allocate two subcarriers for distributing data packets to the user location. As a quality of service for a user location changes, as may be indicated by an updated map message received by the scheduler 228, the bandwidth allocation module may dynamically adjust a bandwidth allocation for a user location by allocating more or fewer subcarriers to accommodate the change in quality of service. An example of such allocation and re-allocation is discussed in association with FIG. 3.

The scheduler 228 may schedule data packets (e.g., PON packets) for distribution over a cable medium using various scheduling techniques. Certain embodiments herein may utilize FIFO scheduling for distributing data packets over a cable medium. According to FIFO scheduling, the first data packets received and stored in a customer queue may be the first data packets encoded onto a subcarrier (e.g., an allocated subcarrier determined by the bandwidth allocation module 228) of an OFDM signal for distribution to a user location by a radio frequency physical layer device (RF/PHY), in one embodiment. Other scheduling techniques may exist in other embodiments, such as fair queuing, weighted fair queuing, or a number of buffering techniques that may delay transmission of at least some data packets with respect to other data packets, as non-limiting examples.

The physical layer device in the media converter 210 may encode data packets onto subcarriers of one or more OFDM signals and distribute the OFDM signals over a cable medium to a user location, in one embodiment, or to a service provider device such as another media converter 210, in another embodiment.

The conversion module 230 may convert data packets into different formats for transmission over a various mediums. In one embodiment, the conversion module 230 may convert PON packets into Ethernet packets for distribution over cables lines to a user location. In another embodiment, the conversion module 230 may convert Ethernet packets to PON packets for distribution over cables lines to an edge serving facility 270, for example. Additional conversions may be performed by the conversion module 230, in other embodiments.

As shown in FIG. 2, the edge serving system 270 may include an OLT 272, a head end 280, and one or more computing devices 282. In one embodiment, the OLT 272 may embody the OLT 112 in FIG. 1. The memory 276 in the OLT 272 may include a content management module 278, which may perform functions to facilitate the processes described herein. For example, the content management module 278 may provide one or more functions associated with provisioning services for user locations, generating map messages associated with such services, and distributing such information to other devices in a service provider network. In some embodiments, such functionality may be provided by the one or more computing devices 282 or the head end 280, which may be a central device for receiving and distributing information over a service provider network.

FIG. 2 also illustrates customer premise equipment 260, which may be located at a user location such as a home. The customer premise equipment 260 may receive content over a service provider network and present the content to a user via one or more display devices, such as a television or monitor (e.g., via one or more user applications 266). Examples of customer premise equipment may include, but are not limited to, set-top boxes, cable modems, routers, or other devices that may receive a signal and provide it to various user devices, such as a computing device, display, etc. In operation, the customer premise equipment 260 may receive at least a portion of a broadband data signal output by the service provider system 100 in FIG. 1 and convert at least a portion of the received signal into content that may be displayed or otherwise output by the display device, in one example.

Figure 3:
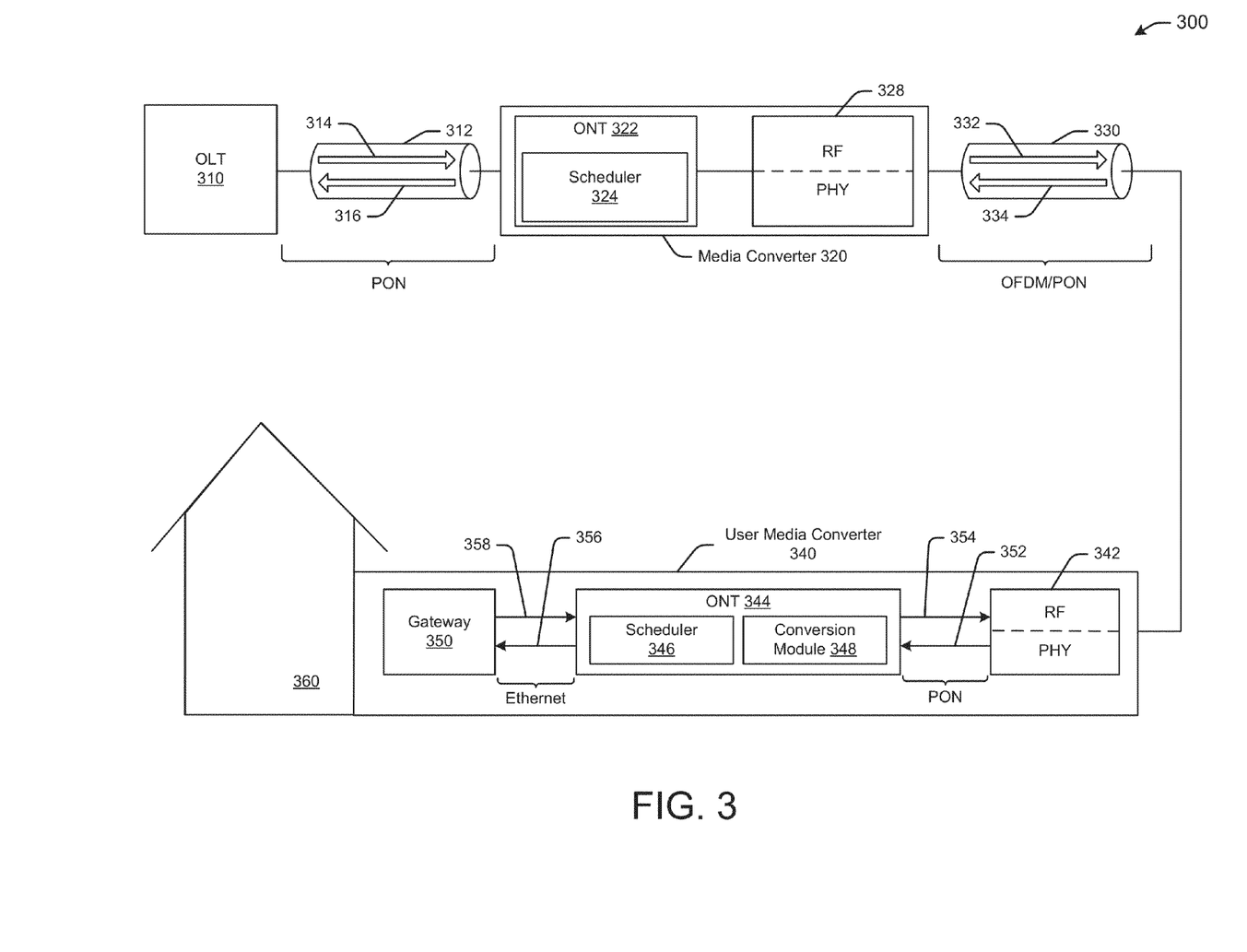
FIG. 3 illustrates a schematic diagram of a configuration for enabling various types of communication over multiple bandwidth mediums in a service provider network, according to an embodiment of the disclosure.

FIG. 3 depicts a schematic diagram of a configuration for enabling various types of communication over multiple bandwidth mediums in a service provider network, according to an embodiment of the disclosure. The embodiment in FIG. 3 illustrates two variable bandwidth mediums. One medium may be an optical fiber 312 that connects an OLT 310 to a media converter 320. A second medium may be a cable line 330 that connects the media converter 320 to a user media converter 340 located at or near a user location 360. According to certain embodiments herein, characteristics of a PON that may include the optical fiber 312 may be maintained over the cable line 330 at least in part by distributing PON packets over the cable medium 330 via OFDM modulation according to FIFO scheduling of the PON packets.

As indicated by arrows 314 and 316, communication may occur over forward or reverse paths, respectively, over an optical fiber 312. Thus, PON packets, or information traveling over a PON with which the optical fiber 312 may be associated, may be sent from an OLT 310 towards a user location using a forward channel 314, and PON packets or other information may be received from a user location using a reverse channel 316. Forward channel or downstream communication may occur via time division multiplexing (TDM) or broadcast communication, and upstream communication may occur via time division multiple access (TDMA). By virtue of utilizing OFDM modulation, which may operate in the frequency division duplex (FDD) domain, certain embodiments herein may maintain a similar channel split over a cable line. In one embodiment, a frequency range may be utilized for forward channel communication and a different frequency range may be utilized for reverse channel communication. An example forward channel may include a frequency range of approximately 88 MHz to 1 GHz. An example return channel may include a frequency range of approximately 5 MHz to 42 MHz. Various other frequency ranges may be utilized in other examples. For example, by virtue of utilizing OFDM modulation, a return path may be extended up to approximately 85 MHz, which may be accompanied by muting unused OFDM subcarriers or tones in an OFDM signal to address any noise or interference that may result.

Examples of communication utilizing a forward path and reverse path over multiple bandwidth mediums in a service provider network may be as follows. Forward path communication may include the media converter 320 receiving content or other information, such as a map message, from the OLT 310 over a forward channel 314 in a link 312 associated with a PON. The media converter 320, e.g., via one or more modules associated with the scheduler 324, may receive PON packets, identify a destination for the PON packets, store the PON packets in a customer queue corresponding to the destination, and schedule the PON packets for OFDM modulation over the cable medium 330 using FIFO scheduling of the PON packets. A physical layer device 328 may encode the PON packets onto subcarriers in the forward link 332 of the cable link 330 and distribute the PON packets to the user media converter 340 via OFDM modulation. In one embodiment, one or more subcarriers within the OFDM signal may be allocated for distributing the PON packets to the user media converter 340 based at least in part on information identified in a map message, e.g., by the bandwidth allocation module 232. Such information may include a quality of service associated with a user location for the PON packets. According to one example, the quality of service may specify a certain bandwidth desired at the destination, which the media converter 328, e.g., via the bandwidth allocation module 232, may use to calculate a number of subcarriers to use for distributing the PON packets. For example, to provide 2 megabits/second bandwidth to a user location, two subcarriers of a 20 megabit carrier that includes twenty 100-MHz frequency spectrums each capable of distributing 10 bits/second/Hz may be allocated.

If the quality of service changes, as may be indicated in an updated map message associated with the destination currently receiving 2 megabits/second, for example, the media converter 320 may allocate more or fewer subcarriers in the forward channel 332. For example, if the quality of service in the updated map message indicates a bandwidth of 3 megabits per second, the media converter 320 may allocate an additional subcarrier such that three subcarriers or 3 megabits/second are provided to the user location, according to the present example. Such an allocation may be dynamic in the way that the media converter 320, e.g., via the bandwidth allocation module 320, may periodically check for updates to map messages in a memory in the media converter 320 or other storage device, analyze the updated information, and perform the allocation or re-allocation as described above.

In addition to content, such as text, video, multimedia, etc., received from the OLT 112, the media converter 320 may also distribute the map messages or other information over the cable medium 330 in similar fashion to that described above in association with the content.

The customer premises media converter 340 may receive an OFDM signal carrying PON packets and provide content associated with the PON packets to a user location, such as a home 360, which may include customer premise equipment, e.g., customer premise equipment 260 in FIG. 2, for presenting the content to a user. The customer premises media converter 340 may reconstitute the PON packets, or retrieve the PON packets from one or more received OFDM signals in an original format before the PON packets were modulated via OFDM. The ONT 344 may receive the PON packets (line 352) and convert the PON packets into Ethernet packets (e.g., via a media converter 348) for receipt by a gateway 350 (line 356), which may distribute the Ethernet packets via one or more networks to customer premise equipment at user location 360, as described above.

Reverse path communication may include the customer premises media converter 340 sending information, such as requests for content, etc., to the media converter 320. In one example, a request for content may originate from customer premise equipment at a user location 360. The gateway 350 may receive the request from the customer premise equipment as Ethernet packets and send the Ethernet packets to ONT 344 (line 358), where the Ethernet packets may be converted, e.g., via the conversion module 348, into PON packets representing the request or other information. The ONT 344 may also perform similar functionality to that described in association with the ONT 322. For example, the ONT 344 may schedule the PON packets for distribution to the media converter 320 using FIFO scheduling. In one embodiment, the scheduling may be based on one or more timeslots identified in a map message received by the user media converter 340. The timeslots in the map message may indicate times at which the user media converter 340 may send requests for content or other information to the media converter 320, or effectively the OLT 310, in one embodiment.

The physical layer device 342 may distribute the PON packets via reverse channel 334 in cable line 330 using OFDM according to information in the map message, in one embodiment. In embodiments in which TDMA is used for reverse path communication, particular subcarriers may not need to be allocated for communication. Timing information defined in the map message may ensure that other media converters that may share the cable line 330 do not send information that may interfere with communications from the user media converter 340. In this way, certain embodiments herein may maintain the concept of slotted ALOHA when distributing PON packets over a cable line as described herein. Upon receiving the PON packets from the user media converter 340, the media converter 320 may send the PON packets, e.g., via the physical layer device 328, to the OLT 310 via reverse channel 316 in the optical fiber 312.

The above example in non-limiting. Many more examples involving different types of communication, information, devices, etc., may exist in other examples. Additional modulation techniques may also be utilized. For example, in addition to OFDM modulation, legacy Quadrature Amplitude Modulation (QAM) may also be used to distribute PON packets over a cable medium, in some embodiments. Different types of mediums, such as copper twisted pair, etc., as well as different types of packets (e.g., voice packets, video packets, etc.), may be distributed over a cable medium, in other embodiments.

Figure 4:
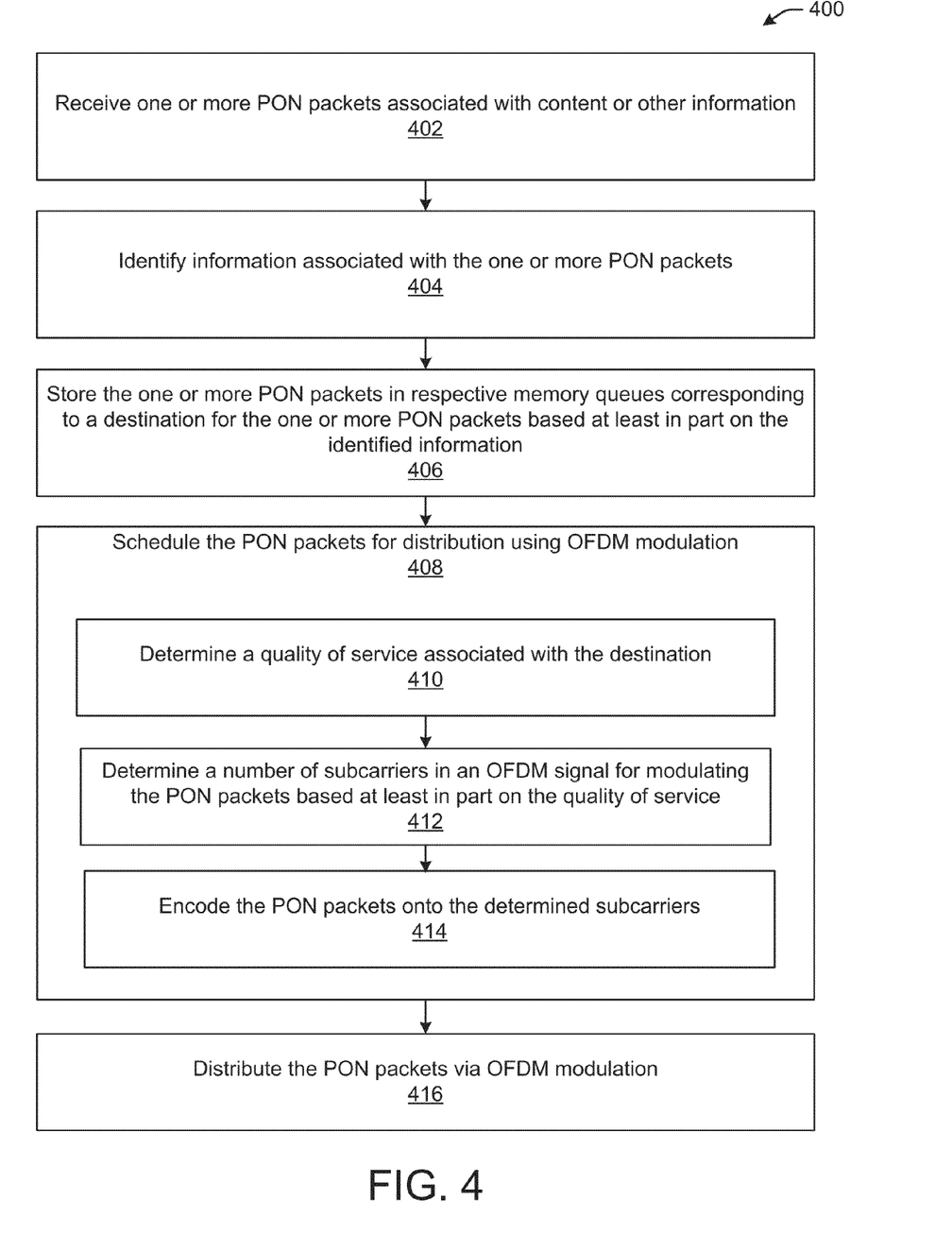
FIG. 4 is a flow diagram of an example method for distributing data packets between a service provider and a user location over multiple bandwidth mediums, according to an embodiment of the disclosure.

FIG. 4 is a flow diagram of an example method for distributing data packets between a service provider and a user location over multiple bandwidth mediums, according to an embodiment of the disclosure. The example flow diagram may be performed by the media converter 210 in FIG. 2, in one embodiment. The method may begin at block 402, where one or more PON packets associated with content or other information may be received over a first medium, such as an optical fiber associated with a PON. Information associated with the one or more PON packets may be identified, e.g., via the identification module 230, at block 404. Such information may include a source of the content (e.g., a content provider such as a television network), a destination of the content (e.g., a user location), and a data port in a network over which the content or other information may have been received. At block 406, the one or more PON packets may be stored, e.g., via the scheduler 228, in respective memory queues corresponding to the respective destination identified for the one or more PON packets.

The one or more PON packets associated with the content or other information may be scheduled for distribution over a second medium (e.g., a cable medium) using OFDM modulation, at block 408. In one embodiment, the scheduling may be performed using FIFO. A quality of service associated with the destination may be determined, e.g., via the bandwidth allocation module 232, at block 410. To determine the quality of service, according to one embodiment, a map message that may include such information may be accessed. In one embodiment, the quality of service may be associated with a bandwidth. At block 412, a number of subcarriers in an OFDM signal to allocate for modulating the PON packets via OFDM may be determined based on the quality of service. In one embodiment, the number of subcarriers may be determined by calculating a number of subcarriers that may be required to provide a particular bandwidth that may be specified in the map message. The PON packets may be encoded on the determined subcarriers according to FIFO scheduling, at block 414.

The PON packets may be distributed over the second medium using OFDM modulation, at block 416. As described, the PON packets may be distributed over the second medium in a manner that maintains PON characteristics, such as increased bandwidths relative to traditional cable medium bandwidths, and a forward and reverse channel split over a single medium (e.g., a cable line) for downstream TDM communication and upstream TDMA communication, respectively.

Figure 5:
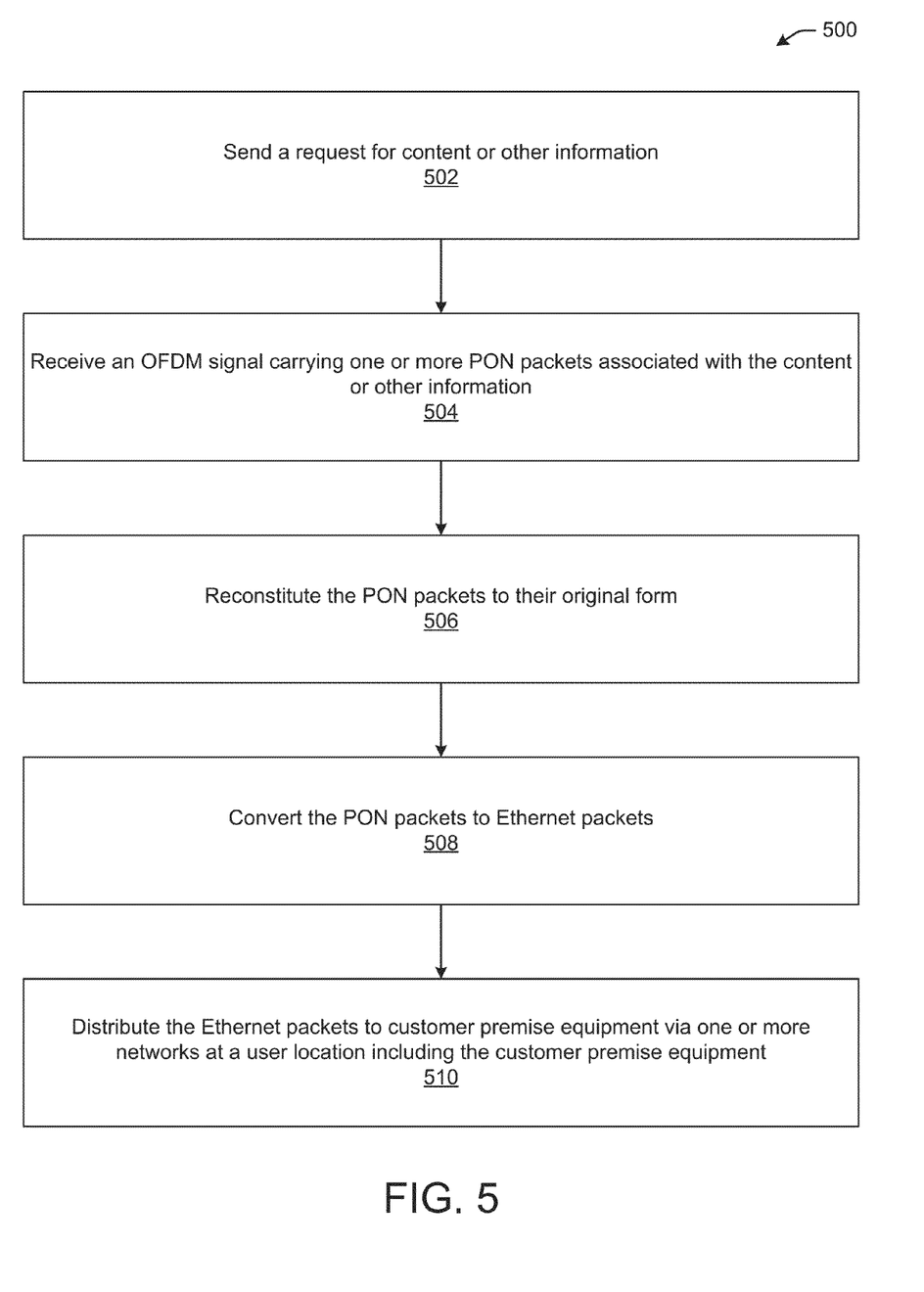
FIG. 5 is a flow diagram of an example method for receiving content at a user location over a relative low bandwidth medium according to characteristics of a relative high bandwidth medium, according to an embodiment of the disclosure.

FIG. 5 is a flow diagram of an example method for receiving content at a user location over a relatively low bandwidth medium (e.g., a cable medium) according to characteristics of a relatively high bandwidth medium (e.g., an optical fiber), according to an embodiment of the disclosure. The example flow diagram may be performed by the user media converter 340 in FIG. 3, in one embodiment. The method may begin at block 502, where a request for content or other information may be sent over a cable medium. In one embodiment, such a request may be sent according to a schedule identified in a map message received by the user media converter 340. The map message may include timeslots during which such requests may be sent by each customer premise equipment device communicating in a service provider network, e.g., service provider network 100 in FIG. 1, in one embodiment.

At block 504, an OFDM signal carrying one or more PON packets associated with the content or other information may be received over the cable medium. The PON packets may be reconstituted to their original form, e.g., before the PON packets were encoded onto the OFDM signal and modulated over the cable medium, at block 506. The PON packets may be converted to Ethernet packets (block 508), which may be distributed to customer premise equipment via one or more networks, such as WiFi, WiFi Direct, MoCA, Bluetooth®, or other networks that may be available in a home that includes the customer premise equipment, according to one embodiment, at block 510. The customer premise equipment, such as a set-top box, cable modem, etc., may present content associated with the Ethernet packets to a customer via a display such as a television or monitor.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

The computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
   at least one memory configured to store computer-executable instructions; and
   at least one processor configured to access the at least one memory and execute the computer-executable instructions to:
   receive, over a first medium having a first bandwidth capacity, one or more PON packets;
   determine one or more first subcarriers in an OFDM signal for carrying the one or more PON packets;
   schedule the one or more PON packets, wherein the scheduling comprises encoding the one or more PON packets onto the one or more first subcarriers according to a scheduling technique;
   distribute the OFDM signal over a second medium, wherein the second medium comprises a second bandwidth that is less than the first bandwidth;
   receive, over the first medium, a map message comprising information associated with a change in quality of service for a customer premise equipment; and
   in response to identifying the change in quality of service, allocate one or more second subcarriers in the OFDM signal for carrying one or more additional data packets to the customer premise equipment.

2. The system of claim 1, wherein the first medium comprises an optical fiber and the second medium comprises a cable line.

3. The system of claim 2, wherein the scheduling technique comprises first in first out (FIFO) scheduling.

4. The system of claim 1, wherein the cable line comprises a forward channel and a reverse channel, wherein the distribution of the OFDM signal occurs over the forward channel, and wherein the at least one processor is further configured to receive, over the reverse channel, a request for content.

5. The system of claim 1, the system further comprising an Optical Line Terminator (OLT), an Optical Network Terminator, one or more amplifiers for amplifying the signal distributed over the second medium, and one or more user locations.

6. The system of claim 1, wherein the quality of service indicates a bandwidth, wherein the determination comprises calculating a number of the one or more second subcarriers based at least in part on the bandwidth.

7. The system of claim 1, the at least one processor further configured to:
   identify information associated with the one or more PON packets, the information comprising a respective destination associated with the one or more PON packets; and
   store the one or more PON packets in a respective memory queue associated with the respective destination.

8. A method comprising:
   receiving, by a media converter comprising one or more computing devices, over a first medium having a first bandwidth capacity, one or more PON packets;
   determining, by the media converter, one or more first subcarriers in an OFDM signal for carrying the one or more PON packets;
   scheduling, by the media converter, the one or more PON packets, wherein the scheduling comprises encoding the one or more PON packets onto the one or more first subcarriers according to a scheduling technique; and
   distributing, by the media converter, the OFDM signal over a second medium, wherein the second medium comprises a second bandwidth that is less than the first bandwidth;
   receiving, over the first medium, a map message comprising information associated with a change in quality of service for a customer premise equipment; and
   in response to identifying the change in quality of service, allocate one or more second subcarriers in the OFDM signal for carrying one or more additional data packets to the customer premise equipment.

9. The method of claim 8, wherein the first medium comprises an optical fiber and the second medium comprises a cable line.

10. The method of claim 9, wherein the scheduling technique comprises first in first out (FIFO) scheduling.

11. The method of claim 8, wherein the cable line comprises a forward channel and a reverse channel, wherein the distribution of the OFDM signal occurs over the forward channel, the method further comprising receiving, over the reverse channel, a request for content.

12. The method of claim 8, wherein the quality of service indicates a bandwidth, wherein the determination comprises calculating a number of the one or more second subcarriers based at least in part on the bandwidth.

13. The method of claim 8, further comprising:
   identifying, by the media converter, information associated with the one or more PON packets, the information comprising a respective destination associated with the one or more PON packets; and storing, by the media converter, the one or more PON packets in a respective memory queue associated with the respective destination.

14. One or more non-transitory computer-readable media storing computer-executable instructions that, when executed by at least one processor, configure the at least one processor to perform operations comprising:

receiving, over an optical fiber having a first bandwidth, one or more PON packets;

determining one or more first subcarriers in an OFDM signal for carrying the one or more PON packets;

scheduling the one or more PON packets, wherein the scheduling comprises encoding the one or more PON packets onto the one or more first subcarriers according to a first in first out (FIFO) schedule;

distributing the OFDM signal over a cable line, wherein the cable line comprises a bandwidth that is less than the first bandwidth;

receiving, over the optical fiber, a map message comprising information associated with a change in quality of service for a customer premise equipment; and in response to identifying the change in quality of service, allocate one or more second subcarriers in the OFDM signal for carrying one or more additional data packets to the customer premise equipment.

15. The one or more non-transitory computer-readable media of claim 14, wherein the cable line comprises a forward channel and a reverse channel, wherein the distribution of the OFDM signal occurs over the forward channel, and wherein the at least one processor is further configured to perform the operation comprising receiving, over the reverse channel, a request for content.

16. The one or more non-transitory computer-readable media of claim 15, wherein the request for content is associated with customer premise equipment at a user location.

17. The one or more non-transitory computer-readable media of claim 14, wherein the at least one processor is further configured to perform the operations comprising:

identifying information associated with the one or more PON data packets, the information comprising a respective destination associated with the one or more PON packets; and storing the one or more PON packets in a respective memory queue associated with the respective destination.

* * * * *